UNITED STATES PATENT OFFICE.

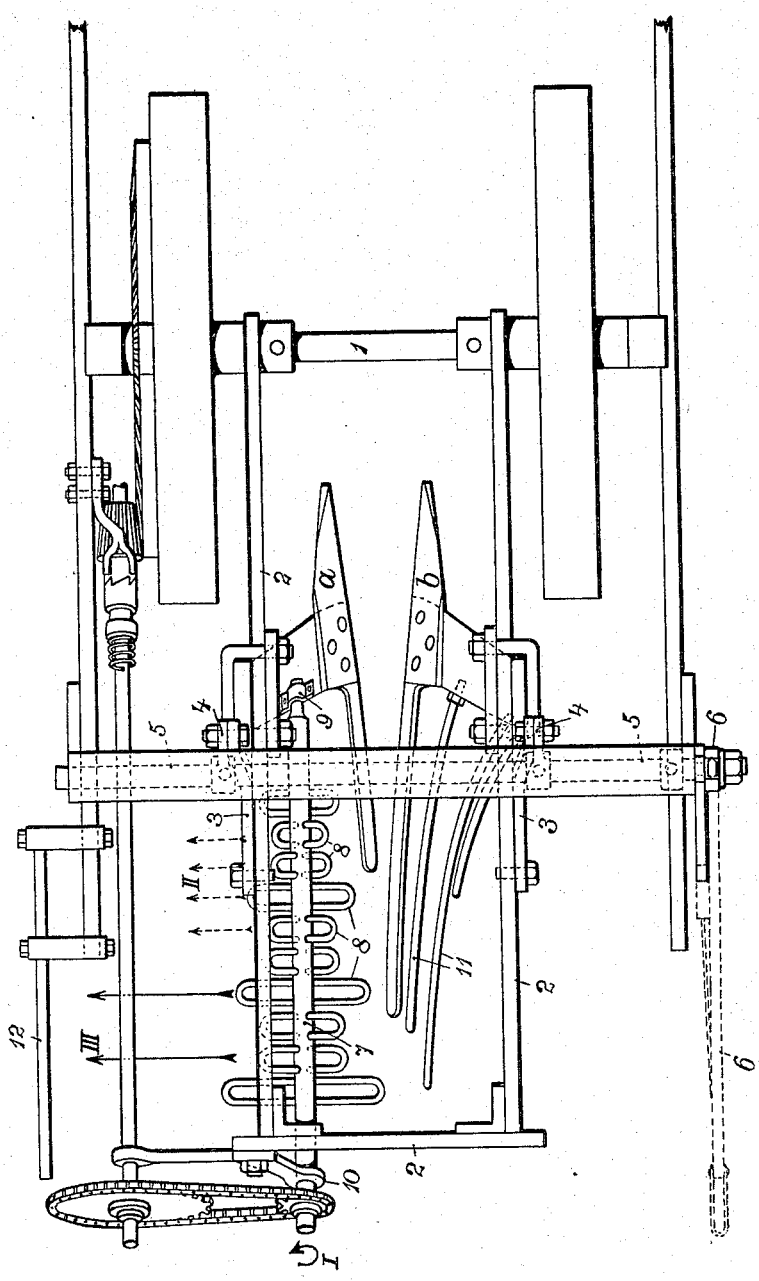

VÁCLAV OTAKAR DEYL, OF VINOR, NEAR PRAGUE, AUSTRIA-HUNGARY.

ROOT-HARVESTER.

1,149,345.   Specification of Letters Patent.   Patented Aug. 10, 1915.

Application filed November 13, 1913. Serial No. 800,773.

*To all whom it may concern:*

Be it known that I, VÁCLAV OTAKAR DEYL, a subject of the Emperor of Austria-Hungary, residing at Vinor, near Prague, Bohemia, Austria-Hungary, have invented certain new and useful Improvements in Root-Harvesters, of which the following is a specification.

This invention relates to a device for ejecting roots in harvesting machines.

The invention comprises one or two rotatable spindles arranged behind the lifting knives and arranged so as to rise toward the back in the longitudinal direction of the machine. These spindles are set with suitable projecting parts, so that the lump of earth forced upward owing to the inclination of the knives, comes together with the roots under the action of the projecting parts which gradually remove the earth from the roots or reduce the lump of earth to small particles and then project the roots together with the remains of the earth, to the side from the center of the machine. The harvesting by means of this device requires a very small consumption of power and has the further advantage that the roots are neither damaged nor covered with earth. The projecting parts act so that during that part of the revolution which is above the spindle, they reduce the lump of earth to small particles as already stated, and during that part of the revolution that is below the spindle, close the furrow produced.

A construction according to this invention for root crops is shown by way of example in the accompanying drawing in plan.

According to the drawing, on the wheel axle 1 is rotatably mounted the knife frame 2 which, by means of two rods 3 connected to levers 4, the other ends of the levers being mounted on a spindle 5 which rotates in bearings on the machine frame and provided with a hand lever 6, can be lowered into the operative position, or raised up out of it. To the knife frame are secured in the known manner the knives *a*, *b*, or a trough-like knife. Behind one of the two knives, for instance behind the knife *a*, is arranged a spindle 7 which extends in a vertical plane parallel to the center line of the machine, slightly rising toward the rear. This spindle is set with suitable projecting parts, for instance, with hoop-like members 8 or shovels or prongs, the length of which gradually increases from the front backward and the said parts being distributed on the spindle in a helical line. The front end of the spindle is supported either in a bearing 9 secured to the knife *a* itself, or in an arm secured to the knife frame. The rear end of the spindle is supported by the lug 10 and is rotated in any suitable manner, for instance by the driving wheel or by a motor in the direction of the arrow I, that is to say, in an anti-clockwise direction looking from the back of the machine. To the other knife *b* or to an arm secured to the knife frame, are secured bars 11.

It will be seen that the lump of earth excavated together with the roots, owing to the inclination of the knives, will be forced upward obliquely until it comes within reach of the projecting parts 8, the shorter of which gradually throw off the earth from the root at II, whereupon the longer projecting arms throw the roots together with the remains of the earth, from the center of the machine in the direction of the arrows III, approximately up to the wall 12. In that way, the projecting parts act during the upper half of the revolution of the spindle, while during the lower half of the revolution they close the furrow with earth. The bars 11 act in such a way that they guide the lump of earth lifted out, toward the projecting parts, during which time they allow part of the earth to drop through but prevent the roots from passing, so that the roots in this construction are ejected only at one side (at III). Instead of the bars, a sheet of metal can also be used.

If the roots are to be ejected at both sides, a second spindle 7 with projecting parts 8 identical with that described is provided, instead of the bars 11, but rotated in the opposite direction.

What I claim as my invention and desire to secure by Letters Patent is:

1. A root harvester comprising a frame, digging means carried by said frame, a spindle arranged behind said digging means, projecting U-shape parts on said spindle, and means for rotating said spindle so that said projecting parts move away from the center line of the machine during the upper part of their rotation.

2. A root harvester comprising a frame, digging means carried by said frame, a spindle arranged behind said digging means, bearings at each end of said spindle, said back bearing being higher than said front bearing, projecting U-shape parts on said spindle, and means for rotating said spindle so that said projecting parts move away from the center line of the machine during the upper part of their rotation.

3. A root harvester comprising a frame, digging means carried by said frame, a spindle arranged behind said digging means, bearings at each end of said spindle, said back bearing being higher than said front bearing, projecting U-shape parts on said spindle increasing in size toward the back of the machine, and means for rotating said spindle so that said projecting parts move away from the center line of the machine during the upper part of their rotation.

4. A root harvester comprising a frame, lifting knives carried by said frame, a bearing on one of said lifting knives, a bearing on the back of the frame arranged higher than the bearing on the knife, a spindle in said bearings, projecting parts on said spindle, means for rotating said spindle so that the projecting parts move away from the center line of the machine during the upper part of their rotation, and means arranged on the other lifting knife so that the piece of earth lifted by the knives is guided toward the spindle.

5. A root harvester comprising a frame, lifting knives carried by said frame, a bearing on one of said lifting knives, a bearing on the back of the frame arranged higher than the bearing on the knife, a spindle in said bearings, projecting parts on said spindle, means for rotating said spindle so that the projecting parts move away from the center line of the machine during the upper part of their rotation, and bars arranged on the other lifting knife so that the piece of earth lifted by the knives is guided toward the spindle.

In testimony whereof I have signed my name to this specification in the presence of two subscribing witnesses.

VÁCLAV OTAKAR DEYL.

Witnesses:
 MILOSLAV HRUBY,
 ADOLPH FISCHER.

Copies of this patent may be obtained for five cents each, by addressing the "Commissioner of Patents, Washington, D. C."